United States Patent
Hatashita

(10) Patent No.: US 7,123,374 B2
(45) Date of Patent: Oct. 17, 2006

(54) FACSIMILE GATEWAY DEVICE

(75) Inventor: Masahiro Hatashita, Souraku-gun (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 912 days.

(21) Appl. No.: 10/053,089

(22) Filed: Jan. 16, 2002

(65) Prior Publication Data
US 2002/0097445 A1    Jul. 25, 2002

(30) Foreign Application Priority Data
Jan. 22, 2001    (JP) ............... 2001-013482

(51) Int. Cl.
*G06F 15/00*  (2006.01)
*H04N 1/00*   (2006.01)
*H04N 1/36*   (2006.01)
*H04L 12/56*  (2006.01)

(52) U.S. Cl. .............. 358/1.15; 358/402; 358/407; 358/434; 358/409; 370/401

(58) Field of Classification Search ........... 358/1.15, 358/407, 434–439, 442, 400–404, 468, 409; 379/100.01; 370/218, 401

See application file for complete search history.

(56) References Cited
U.S. PATENT DOCUMENTS 4,999,716 A *  3/1991  Nakamura ........... 358/434
5,881,064 A    3/1999  Lin et al.
6,285,466 B1 * 9/2001  Chimura et al. ....... 358/434

FOREIGN PATENT DOCUMENTS
JP    11-041443    2/1999

\* cited by examiner

*Primary Examiner*—Kimberly Williams
*Assistant Examiner*—Charlotte M. Baker
(74) *Attorney, Agent, or Firm*—Hogan & Hartson LLP

(57) ABSTRACT

The present invention relates to a facsimile gateway device capable of easily avoiding interruption of facsimile communication due to a delay in data transmission via the Internet, without changing a communication procedure. A main control unit of the gateway device receives facsimile image data from one facsimile machine via the Internet, and stores the image data into an image data memory area of a hard disk drive. When transmitting the image data to a destination facsimile machine via a public switched telephone network, the gateway device transmits a TCF signal, to which error data is appended, if image data of one page worth is not stored in the image data memory area. The TCF signal is a procedure signal for facsimile communication, and is a test data for training. The error data is, for example, all "1" data.

20 Claims, 5 Drawing Sheets

FACSIMILE GATEWAY DEVICE

CROSS REFERENCES TO RELATED APPLICATIONS

This application claims priority under 35 USC 119 of Japanese Patent Application No. 2001-13482 filed on Jan. 22, 2001, and the entire disclosure thereof is incorporated herein by reference.

BACKGROUND OF THE INVENTION

1. Field of the Invention

The present invention relates to a facsimile gateway device for inverting a packet data into a facsimile image data, which serves as a second gateway device in a real time Internet facsimile communication system adapted to transmit the facsimile image data from a data transmitting communication terminal device such as a facsimile machine to a data receiving communication terminal device such as a remote facsimile machine via a first communication network (e.g., a public switched telephone network), a first gateway device for converting the image data into the packet data, a second communication network (e.g., the Internet), the second gateway device, and a third communication network (e.g., the public switched telephone network).

2. Description of the Related Art

A real time Internet facsimile communication system for transmitting an image data from one facsimile machine to another facsimile machine via a public switched telephone network, a first gateway device for converting the image data into a packet data, the Internet, a second gateway device for reconverting the packet data into the image data, and the pubic switched telephone network, under a communication procedure same as the facsimile communication procedure in accordance with ITU-T (International Telecommunication Union) Recommendation T. 30 is realized (hereafter referred to as the "conventional example"). Such conventional example is defined in ITU-T Recommendation T. 38.

According to such conventional example, a general facsimile machine on the transmitting side transmits a facsimile image data under the facsimile communication procedure in accordance with ITU-T Recommendation T. 30 to the first gateway device via the public switched telephone network. The first gateway device converts the image data into a predetermined packet data and transmits the packet data to the second gateway device via the Internet. Then, the second gateway device reconverts the packet data into the facsimile image data and transmits the image data to a destination facsimile machine via the public switched telephone network. The communication procedure signal used between the facsimile machine on the transmitting side and the facsimile machine on the receiving side is similar to a facsimile communication procedure signal defined in ITU-T Recommendation T. 30. The facsimile data communication between the two gateway devices is carried out using the packet data.

The above described conventional example has an advantage in that a communication expense for transmitting the facsimile image data can be suppressed since the overall distance in the public switched telephone network is shortened.

As mentioned earlier, the second gateway device is expected to receive the image data via the Internet and transmit the image data to the remote facsimile machine in real time via the public switched telephone network. However, there is a certain delay in the transmission via the Internet, and therefore the second gateway device sometimes cannot transmit the image data to the remote facsimile machine via the public switched telephone network in time.

In order to overcome such problem, a flow control is applied to the second gateway device when transmitting and receiving the image data. However, a manufacturing cost is increased due to a complicated program for the flow control.

SUMMARY OF THE INVENTION

An advantage of the present invention is to provide a facsimile gateway device that is used as a second gateway device in a real time Internet facsimile communication system and is capable of avoiding interruption of the facsimile communication due to the delay in the data transmission over the Internet, easily as compared with the conventional technology, without changing the communication procedure for the second gateway device.

According to one aspect of the present invention, there is provided a gateway device for use with a real time Internet facsimile communication system adapted to transmit a facsimile image data from a first communication terminal device to a second communication terminal device via a first communication network, a device for converting the facsimile image data into a packet data, a second communication network, the gateway device, and a third communication network, said gateway device comprising: a storage unit for receiving the packet data from the second communication network; an inverting unit for inverting the packet data into the facsimile image data; and a control unit for normally transmitting the facsimile image data to the second communication terminal device via the third communication network, and for appending an error data to a test data used for a training purpose and transmitting the error data together with the test data, instead of the facsimile image data, to the second communication terminal device via the third communication network if an amount of the facsimile image data stored in the storage unit is smaller than a prescribed amount. The gateway device of the invention can avoid interruption of facsimile communication caused by a delay in data transmission made over the Internet, without modifying a communication procedure.

The error data may consist of a series of predetermined numbers and the test data may be a TCF signal. A series of predetermined numbers may consist of a plurality of "1"s only. An amount of the error may be at least four times as much as the test data.

The first communication terminal device may scan a document having a plurality of pages and prepare the facsimile image data to be sent to the first communication network. When the image data of all the pages are not received by the gateway device and/or transmitted to the second communication terminal device from the gateway device and the amount of the facsimile image data stored in the storage unit is smaller than the prescribed amount, then the gateway device may receive again the facsimile image data from the second communication network and store the facsimile image data into the storage unit. This causes the gateway device to prioritize the image data reception when the storage unit has not stored the prescribed amount of data, and contributes to prevention of the facsimile communication interruption due to the delay in the Internet transmission.

The control unit may control a modem speed such that the modem speed does not decrease when the control unit receives an FTT signal from the second communication terminal device in response to the error data and the test data.

This makes it possible to perform the real time Internet facsimile communication at a high speed without lowering the modem speed.

DETAILED DESCRIPTION OF THE INVENTION

An embodiment of the present invention will now be described in reference to the accompanying drawings.

Figure 1:
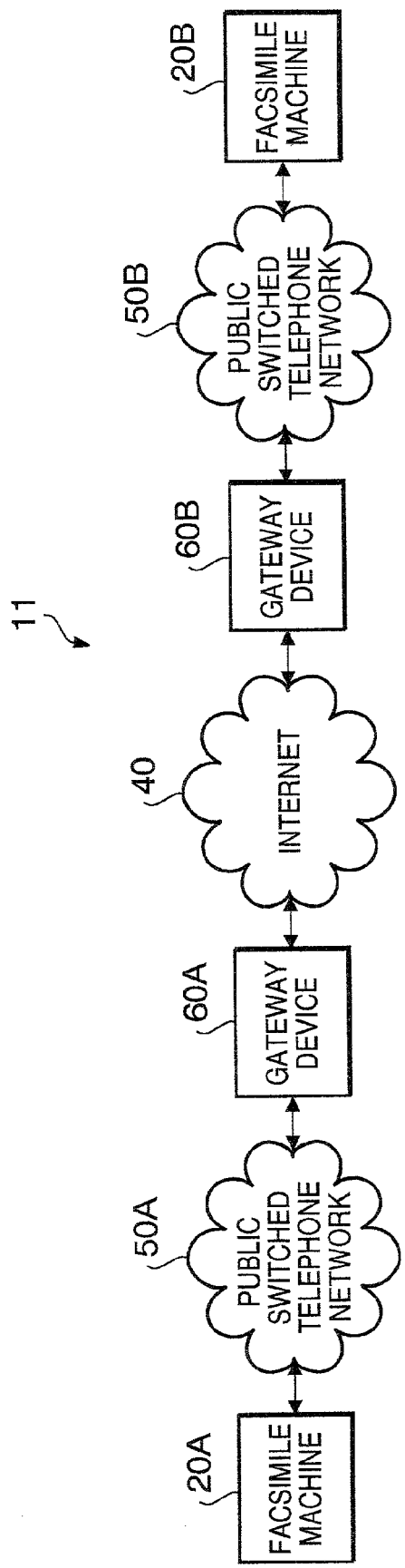
FIG. 1 is a block diagram showing a structure of a real time Internet facsimile communication system according to an embodiment of the present invention.

Referring to FIG. 1, illustrated is a block diagram of a real time Internet facsimile communication system 11 according to one embodiment of the present invention. The illustrated Internet facsimile communication system 11 is improvement over the conventional example which operates in accordance with ITU-T Recommendation T. 38. A facsimile machine 20A of the transmitting side and a first gateway device 60A are connected to each other via a public switched telephone network 50A. The first gateway device 60A is coupled with a second gateway device 60B via the Internet 40. The second gateway device 60B and a remote facsimile machine 20B are connected to each other by a public switched telephone network 50B. The public switched telephone networks 50A, 50B can be the same public switched telephone network, or different types of public switched telephone networks. The facsimile machines 20A, 20B are common facsimile machines designed to carry out a facsimile communication via a common public switched telephone network, and are designated generically by a reference numeral 20. The gateway devices 60A, 60B are provided in different places, but preferably have the same structure. The gateway devices 60A, 60B are designated generically by a reference numeral 60.

The facsimile machine 20A transmits a facsimile message including a facsimile image data to the gateway device 60A via the public switched telephone network 50A under the facsimile communication procedure in accordance with ITU-T Recommendation T. 30. The gateway device 60A converts the facsimile message to a predetermined packet data, and transmits the packet data to the gateway device 60B via the Internet 40. The gateway device 60B then inverts the packet data into a facsimile message including the facsimile image data, and transmits the facsimile message to the remote facsimile machine 20B via the public switched telephone network 50B. Signals of the communication procedure between the two facsimile machines 20A, 20B are similar to (or the same as) facsimile communication procedure signals defined in ITU-T Recommendation T. 30. It should be remembered, however, that the facsimile communication between the two gateway devices 60A, 60B is carried out by using the packet data. The packet data is utilized for the communication procedure signals. In this particular specification, the facsimile message includes facsimile communication procedure signals and message signals transmitting image data.

Figure 3:
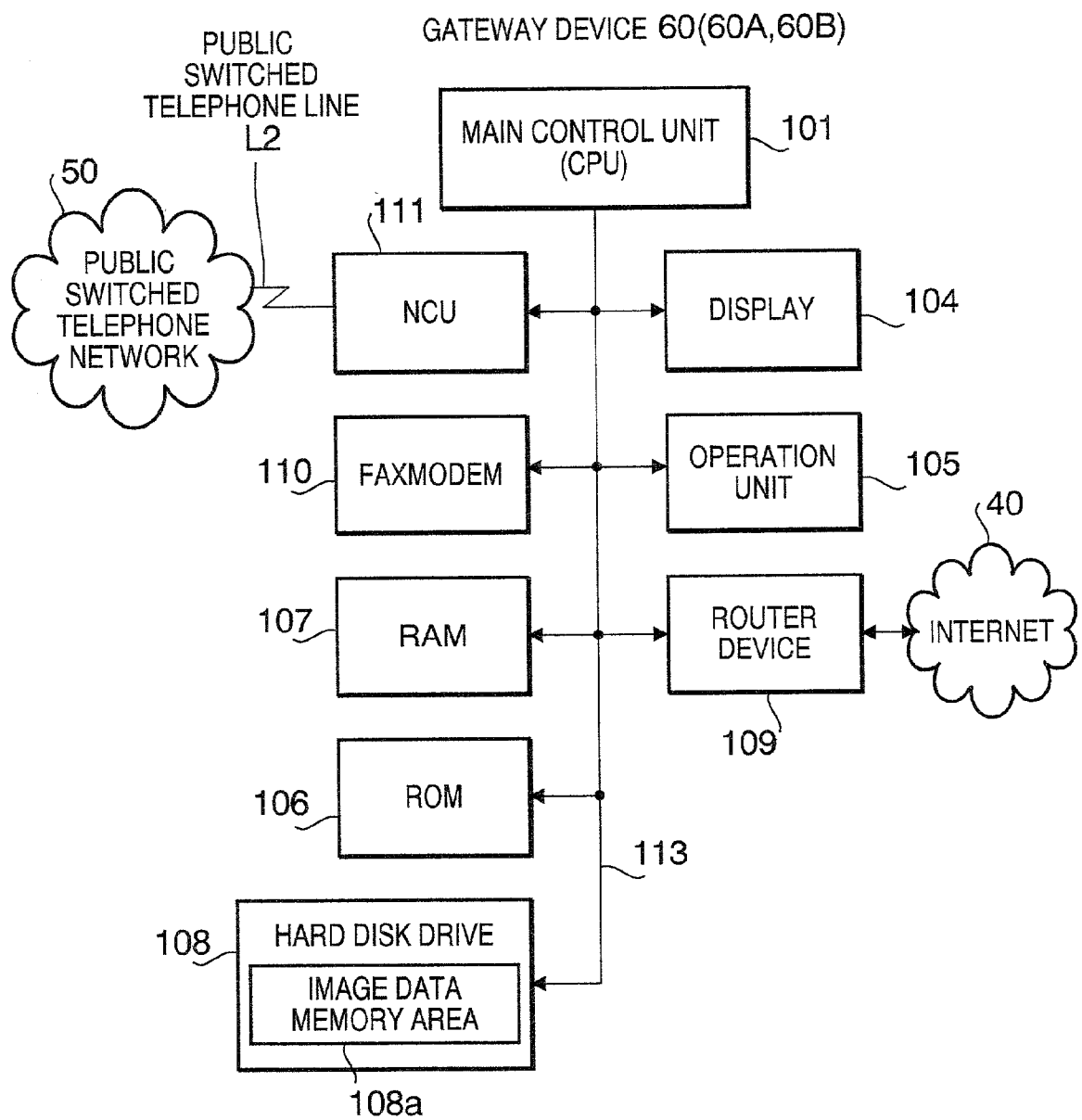
FIG. 3 is a block diagram showing a structure of a gateway device used in the Internet facsimile communication system shown in FIG. 1.
Figure 4:
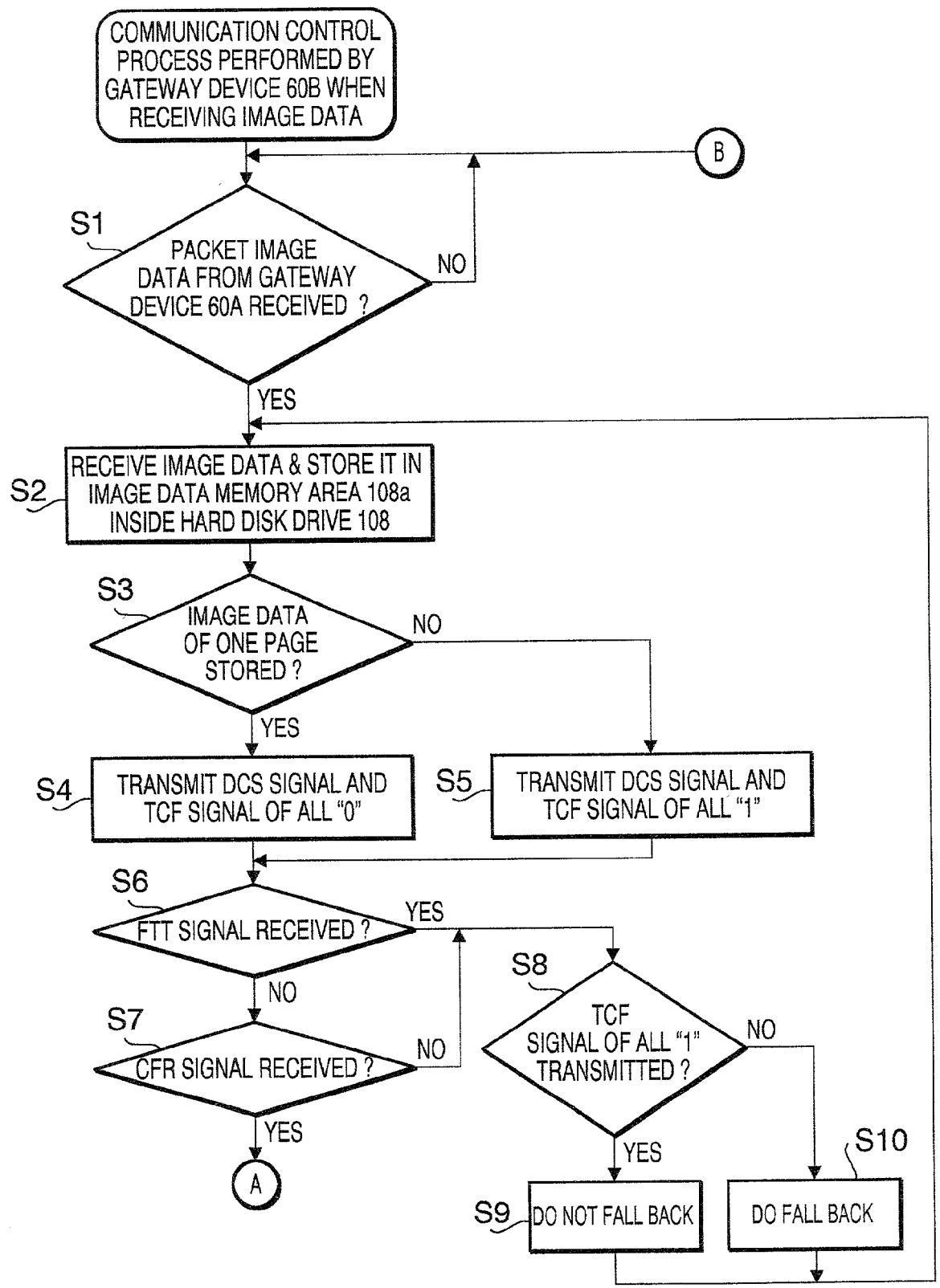
FIGS. 4 and 5 illustrate in combination a flowchart of a communication control process executed by a main control unit of the gateway device shown in FIG. 3 when receiving image data.
Figure 5:
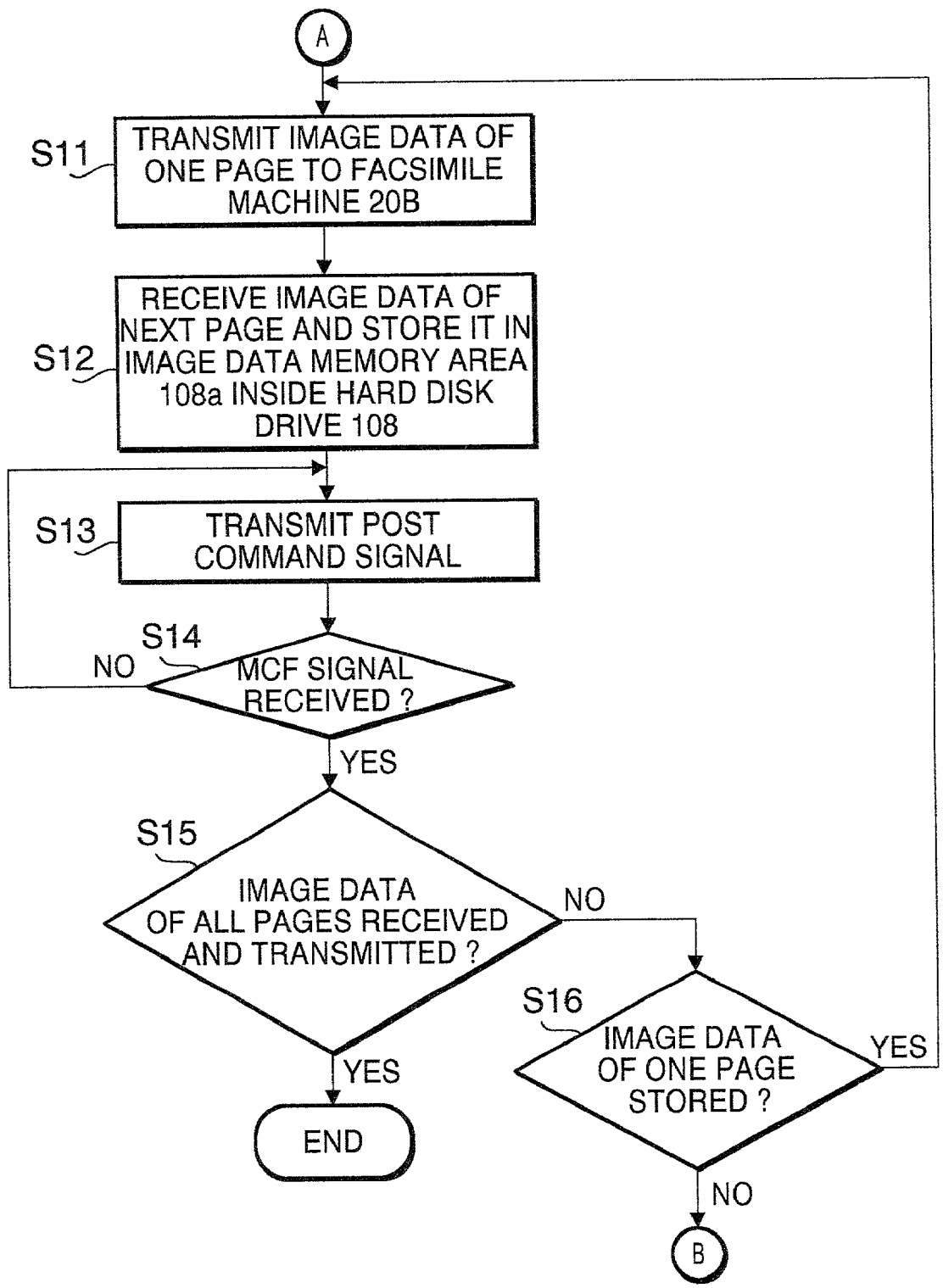

Referring to FIGS. 3 to 5, three features of the second gateway device 60B will be described briefly.

First Feature:

A main control unit 101 of the second gateway device 60B receives the facsimile image data from the Internet 40 and stores the image data into an image data memory area 108a inside a hard disk drive 108 (Step S2 in a flowchart shown in FIG. 4). When transmitting the image data to the facsimile machine 20B via the public switched telephone network 50B, the main control unit 101 appends a predetermined error data to a TCF signal (Step S5) if, for example, the image data of one page worth is not stored in the image data memory area 108a (NO in Step S3). The error data may consist of a prescribed series of numbers such as all "1"s. The error data is considered to be sufficient when it occupies 80~100% of the whole TCF data. The TCF signal is a communication procedure signal of the facsimile communication, and it is a test data for training.

Second Feature:

The main control unit 101 of the gateway device 60B successively receives the facsimile image data, which is prepared by scanning a document having a plurality of pages, from the Internet 40 and stores the image data in the image data memory area 108a inside the hard disk drive 108 (Step S 12 in FIG. 5), but if the image data of all pages is not received from the gateway device 60A and/or transmitted to the remote facsimile machine 20B (NO in Step S15), the main control unit 101 determines again whether the image data of one page is not stored in the image memory data area 108a (Step S16). If not (NO in Step S16), the main control unit 101 receives the facsimile image data from the Internet 40 again and stores the image data in the image data memory area 108a.

Third Feature:

When an FTT signal is received from the remote facsimile machine 20B (YES in Step S6) in response to the TCF signal including the error data of all "1" (Step S5 is carried out and YES in Step S8), the main control unit 101 of the gateway device 60B controls the modem speed to not fall back (Step S9).

Figure 2:
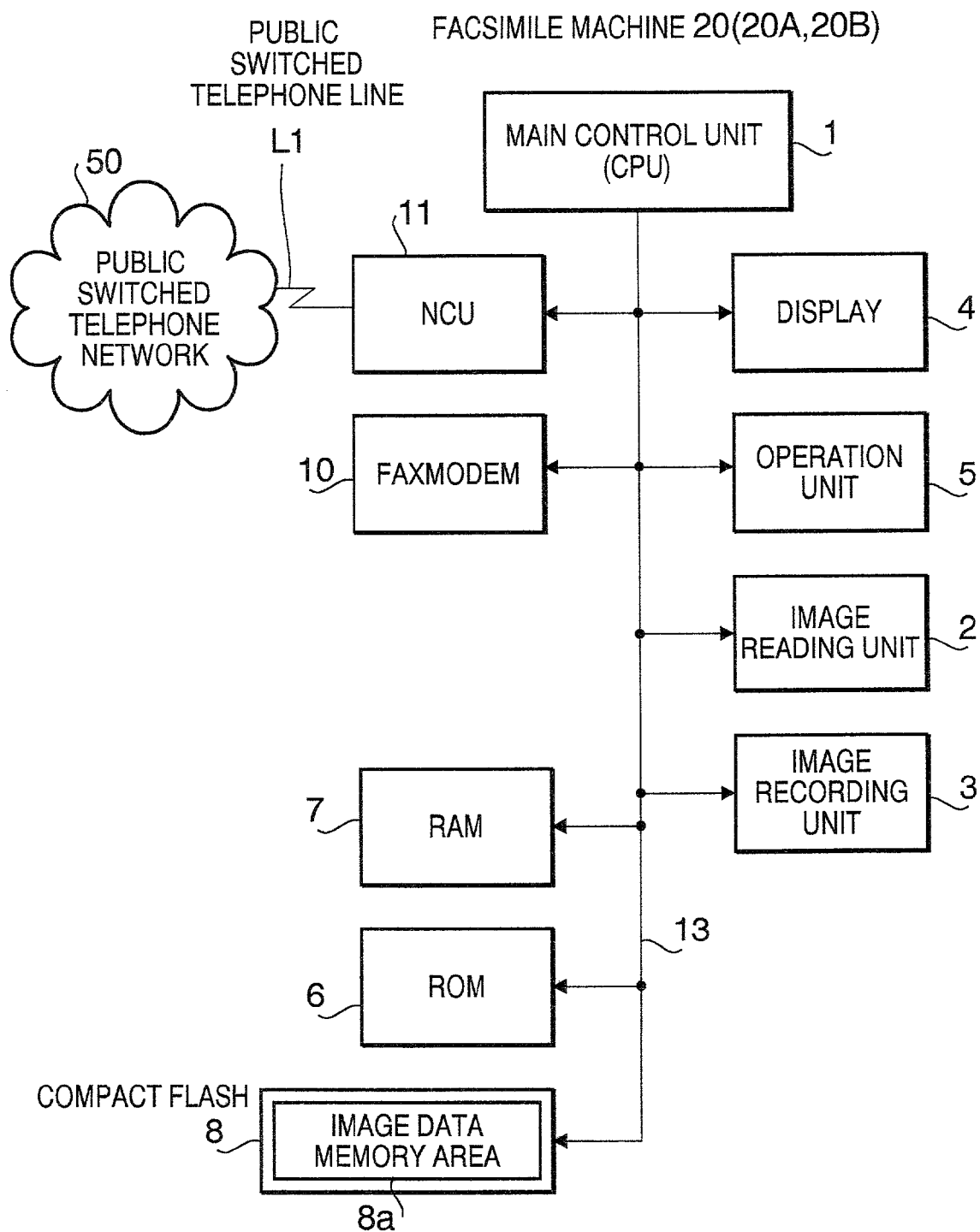
FIG. 2 is a block diagram showing a structure of a facsimile machine used in the Internet facsimile communication system shown in FIG. 1.

FIG. 2 is a block diagram showing a structure of the facsimile machine 20 (20A, 20B) shown in FIG. 1. The facsimile machine 20 possesses a facsimile communication function such as a conventional G3 mode. The main control unit 1 includes a CPU (Central Processing Unit). The main control unit 1 controls each hardware element connected to the main control unit 1 via a bus 13, and carries out various software (will be described). An image reading (or scanning) unit 2 is a scanner using a CCD (Charged Coupled Device) or the like to read a document and convert it into a black-white binary data thereby producing a dotted image data. An image recording unit 3 is a printing machine of electrophotographic type or the like, and prints out the image data received from the facsimile machine by the facsimile communication to record the image data as a hard copy on a recording sheet. A display unit 4 is an LCD (Liquid Crystal Display) or a CRT (Cathode Ray Tube) display, and displays the operational condition of the facsimile machine 20, and/or the image data to be transmitted or received.

An operation unit 5 includes various keys, such as letter keys necessary for operating the facsimile machine 20, a ten-key numeric keypad for dialing, speed dialing keys, one-touch dial keys, and various kinds of function keys. If the display 4 is a touch panel type display, a part or all of the various keys of the operation unit 5 can be displayed in the display screen.

A ROM (Read Only Memory) 6 stores in advance various software which is necessary for the operation of the facsimile machine 20. The software is executed by the main control unit 1. It should be noted that the software may be recorded on a separate recording medium, such as a floppy disk, MO (magneto-optic disk), DVD-RAM. The recording medium may be loaded to a RAM (Random Access Memory) 7 via a drive device such that the software recorded on the recording medium is executed. The RAM 7 is an SRAM (Static RAM), used as a working area for the main control unit 1, and stores temporary data generated when the program is carried out. A compact flash 8 includes an image data memory area 8a for storing the image data of before and after encoding, and the image data of before and after decoding.

A faxmodem 10 is connected to the public switched telephone network 50 via a public switched telephone line L, and can serve as a faxmodem for common facsimile communication. The faxmodem 10 demodulates the data of a dialed telephone number received as an FSK (Frequency Shift Keying) signal and outputs the demodulated data to the main control unit 1. An NCU (Network Control Unit) 11 closes and releases a DC loop of the analogue public switched telephone line L. The NCU is a hardware circuit having an automatic dialing function. The NCU 11 connects the faxmodem 10 to the public switched telephone line L when necessary. The NCU 11 is capable of detecting an ID receiving terminal actuation signal in a dialed telephone number reporting service and detecting a general telephone call signal. The NCU 11 is also able to issue a first response signal and a second response signal in the dialed telephone number reporting service. It should be noted that the NCU 11 can be connected to a digital network that operates with a baseband transmission scheme (for example, ISDN) via a suitable terminal adapter and a DSU (Digital Service Unit).

When the facsimile machine 20A sends the data to the remote facsimile machine 20B, the dotted image data read by the image reading unit 2 is coded by the software such as an MH (Modified Huffman), MR (Modified Read), MMR (Modified Modified Read) method which are defined in the facsimile communication standard. The coded data is then transmitted to the gateway devices 60A, 60B or the remote facsimile machine 20B. When the facsimile machine 20A receives the data from the remote facsimile machine 20B or the gateway devices 60A, 60B, on the other hand, the received coded data is decoded into an image data by the software and is printed out as a hard copy from the printing unit 3.

FIG. 3 is a block diagram showing the structure of the gateway device 60 (60A, 60B) shown in FIG. 1.

The gateway device 60 is a digital computing machine, such as a personal computer or a work station. The main control unit 101 receives the facsimile image data from the facsimile machine 20A of the transmitting side shown in FIG. 1 via the public switched telephone network 50 and a public switched telephone line L2, and converts the received image data into a packet data of the image data. Then, the main control unit 101 transmits the packet data to the gateway device 60B via a router device 109 and the Internet 40. The main control unit 101 of the second gateway device 60B receives the packet data from the first gateway device 60A via the Internet 40 and the router device 109, and inverts the received packet data into an image data for general facsimile communication. Then, the main control unit 101 of the second gateway device 60B transmits the image data to the facsimile machine 20B of the receiving side via the public switched telephone line L2 and the public switched telephone network 50B. During the above described operation, the gateway device 60 carries out the communication control process shown in FIGS. 4 and 5. When transmitting the image data from the facsimile machine 20A via the gateway devices 60A, 60B to the destination facsimile machine 20B, the procedure signals for facsimile communication in accordance with ITU-T Recommendation T. 30 are exchanged between the two facsimile machines 20A, 20B.

The main control unit 101 is a CPU, controls each hardware element connected to the main control unit 101 via the bus 13, and executes various software. A display unit 104 is, for example, as an LCD or CRT, and displays the operational condition of the gateway device 60. An operation unit 105 has various keys, such as letter keys necessary for operating the gateway device 60, a ten-key numeric keypad for dialing, speed dialing keys, one-touch dial keys, and various other function keys.

A ROM 106 stores in advance the program (software) necessary for the operation of the gateway device 60. The program is executed by the main control unit 101. Such program includes at least the program for the communication control as shown in FIGS. 4 and 5. The program may be recorded in a separate recording medium, such as a floppy disk, MO, DVD-RAM, and loaded in an RAM 107 via a drive device when the program should be executed. The RAM 107 is an SRAM, is used as a working area of the main control unit 101 and stores temporary data generated while the program is being carried out. The hard disk drive 108 is a storage device which has a hard disk for recording and retrieving data. The hard disk drive 18 includes an image data memory area 108a to store the data of the facsimile message to be transmitted and received, or the like.

The faxmodem 110 and NCU 111 are constructed in the same manner as the faxmodem 10 and NCU 11 of the facsimile machine 20 respectively, and the NCU 111 is connected to the public switched telephone network 50 via the public switched telephone line L2. The router device 109 is connected to the gateway device 60A or 60B (FIG. 1) via the Internet 40. The packet data transmitted from the gateway device 60A is released from the router device 109 of the gateway device 60A, and transmitted to the other gateway device 60B via the Internet 40. The packet data transmitted from the gateway device 60B is released from the router device 109 of the gateway device 60B, and transmitted to the gateway device 60A via the Internet 40. The network connection from the router device 109 to the Internet 40 is not to be limited to use of the dedicated line, but can be of dial-up connection using the public switched telephone line L2.

FIGS. 4 and 5 in combination show a flowchart for the communication control carried out by the main control unit 101 of the gateway device 60B shown in FIG. 3 while the image data is being received.

Referring to FIG. 4, it is first determined in Step S1 whether or not the gateway device 60B receives the packet data of the image data from the gateway device 60A. When the answer is NO, Step S1 is repeated. When the answer is YES, the program proceeds to Step S2, and the image data is accepted and stored in the image data memory area 108a inside the hard disk drive 108. Then, it is determined in Step S3 whether or not the image data of one page is stored. When the answer is YES, the program proceeds to Step S4, and the gateway device 60B transmits a DCS signal and a TCF signal, which carries a data representing normality. The data representing normality is the non-error data, and may consist of "0"s. The program then proceeds to Step S6. On the other hand, when the answer is NO in Step S3, the program advances to Step S5 such that the DCS signal and the TCF signal including the error data (all "1" data) are transmitted. The program then proceeds to Step S6.

In Step S6, it is determined whether or not an FTT signal is received by the gateway device 60B. When the answer is NO, it is determined in Step S7 whether a CFR signal is received. VVhen the answer is YES in Step S6 or the answer is NO in Step S7, the program goes to Step S8 to determine whether or not an TCF signal of all "1" is transmitted from the gateway device 60B. When the answer is YES, the program goes to Step S9 to prevent the modem speed from falling back (in other words, the current modem speed is maintained). The program returns to Step S2 after Step S9. On the other hand, when the answer is NO in Step S8, the program proceeds to Step S10 to cause the modem speed to fall back before returning to Step S2. When the CFR signal is received by the gateway device 60B in Step S7, the program proceeds to Step S11 (FIG. 5).

In Step S11, the image data of one page (or the first page) of the original document scanned by the scanner 2) is transmitted to the destination facsimile machine 20B. In the subsequent Step S12, the image data of a next page (or the second page) is received by the gateway device 60B and stored in the image data memory area 108a inside the hard disk drive 108. In Step S13, the gateway device 60B transmits a post command signal which is a facsimile message. Then, it is determined in Step S14 whether or not the gateway device 60B receives an MCF signal. When the answer is NO, the program returns to Step S13. When the answer is YES, the program proceeds to Step S15. In Step S15, it is determined whether or not the image data of all the pages are received by the gateway device 60B and transmitted to the facsimile machine 20B. When the answer is YES, the communication control process is completed. On the other hand, when the answer is NO, it is determined in Step S16 whether or not the image data of one page is stored in the gateway device 60B. When the answer is YES, the program returns to Step S11. When the answer is NO, the program returns to Step S1 (FIG. 1).

As described above, the main control unit 101 of the gateway device 60B receives the facsimile image data supplied over the Internet 40 and stores it into the image data memory area 108a of the hard disk drive 108 (Step S2 in FIG. 4). Then, when transmitting the image data to the facsimile machine 20B via the public switched telephone network 50B, the main control unit 101 appends the error data (all "1" data) to the TCF signal which is the test data for training, and transmits the TCF signal (Step S5) if the image data of one page is not stored in the image data memory area 108a (NO in Step S3). Therefore, the interruption of the facsimile communication due to the delay in the transmission over the Internet can be avoided easily, as compared with the conventional technology, without changing the communication procedure.

After the main control unit 101 of the gateway device 60B receives the facsimile image data from the Internet 40 and stores it into the image data memory area 108a of the hard disk drive 108 (Step S12 in FIG. 5), the main control unit 101 receives the facsimile image data over the Internet 40 again and stores it into the image data memory area 108a if the image data of all the pages of the original document are not received and/or transmitted (NO in Step S15) and the image data of one page is not stored in the image data memory area 108a (NO in Step S16). Therefore, when the image data of one page is not stored in the image data memory area 108a inside the hard disk drive 108, the receiving of the image data is prioritized, and the interruption of the facsimile communication due to the delay in the transmission via the Internet can be avoided.

When the main control unit 101 of the gateway device 60B transmits the TCF signal including the error data (execution of Step S5 and YES in Step S8) and receives the FTT signal from the facsimile machine 20B (YES in Step S6), the main control unit 101 controls the modem speed such that no fall back occurs in the modem speed (Step S9). Therefore, in addition to above mentioned two advantages, the real time Internet facsimile communication can be performed at a high speed without decreasing the modem speed.

The present invention is not limited to the illustrated and described embodiment. For example, the public switched telephone networks 50A, 50B and the Internet 40 are not necessarily used in the above described way. Specifically, the public switched telephone networks 50A, 50B may be the same public switched telephone network. Alternatively, the networks 50A, 50B may be any suitable exchanging networks. The Internet 40 may be replaced with any suitable packet exchanging network or a dedicated line.

Although the embodiment has been described in connection with the facsimile machine 20, the present invention can be applied to other communication terminal devices such as a telephone set or a data communication device connected to a public switched network (e.g., the public switched telephone network or the public digital communication network).

In the illustrated embodiment, Step S3 in FIG. 4 and Step S16 in FIG. 5 determine whether the image data of one page is stored. However, Step S3 and/or Step S16 may determine whether the image data of a prescribed amount (e.g., 64 kilobytes in case of ECM) is stored.

What is claimed is:

1. A gateway device comprising:
    a storage unit for receiving a packet data from a second communication network;
    a control unit for inverting the packet data into a facsimile image data and for normally transmitting the facsimile image data to a second communication terminal device via a third communication network, and for appending an error data that is purposely preset to indicate that an error condition exists to a TCF signal and, in order to prevent a change in transmission speed, transmitting the error data together with the TCF signal, instead of a standard TCF signal in which error data is preset to indicate that an error condition does not exist, to the second communication terminal device via the third communication network if an amount of the facsimile image data stored in the storage unit is smaller than a prescribed amount.

2. The gateway device according to claim 1, wherein the error data consists of a series of predetermined numbers.

3. The gateway device according to claim 2, wherein the series of predetermined numbers consists of a plurality of "1"s only.

4. The gateway device according to claim 1, wherein a first communication terminal device scans a document having a plurality of pages and prepares the facsimile image data to be sent to a first communication network, and when the image data of all the plurality of pages are not received by the gateway device or not transmitted to the second communication terminal from the gateway device and the amount of the facsimile image data stored in the storage unit is smaller than the prescribed amount, then the gateway device receives again the facsimile image data from the second communication network and stores the facsimile image data into the storage unit.

5. The gateway device according to claim 1, wherein the control unit controls a modem speed such that the modem speed does not decrease when the control unit receives an FTT signal from the second communication terminal device in response to the error data and the TCF signal sent to the second communication terminal device.

6. The gateway device according to claim 2, wherein the control unit controls a modem speed such that the modem speed does not decrease when the control unit receives an FTT signal from the second communication terminal device in response to the error data and the TCF signal sent to the second communication terminal device.

7. The gateway device according to claim 3, wherein the control unit controls a modem speed such that the modem speed does not decrease when the control unit receives an FTT signal from the second communication terminal device in response to the error data and the TCF signal sent to the second communication terminal device.

8. The gateway device according to claim 4, wherein the terminal device in response to the error data and the TCF signal sent to the second communication terminal device.

9. The gateway device according to claim 1, wherein an amount of the error is at least four times as much as the TCF signal.

10. A gateway device comprising:
a storage means for receiving a packet data from a second network;
means for inverting the packet data into a facsimile image data; and
control means for normally transmitting the facsimile image data to a second terminal device via a third network, and for appending an error data that is purposely preset to indicate that an error condition exists to a TCF signal and, in order to prevent a change in transmission speed, transmitting the error data together with the TCF signal, instead of a standard TCF signal in which error data is preset to indicate that an error condition does not exist, to the second terminal device via the third network if an amount of the facsimile image data stored in the storage means is smaller than a prescribed amount.

11. The gateway device according to claim 10, wherein the error data consists of a series of predetermined numbers.

12. The gateway device according to claim 11, wherein the series of predetermined numbers consists of a plurality of "1"s only.

13. The gateway device according to claim 10, wherein a first terminal device scans a document having a plurality of pages and prepares the facsimile image data to be sent to a first network, and when the image data of all the plurality of pages are not received by the gateway device or not transmitted to the second terminal from the gateway device and the amount of the facsimile image data stored in the storage means is smaller than the prescribed amount, then the gateway device receives again the facsimile image data from the second network and stores the facsimile image data into the storage means.

14. The gateway device according to claim 10, wherein the control means controls a modem speed such that the modem speed does not decrease when the control means receives an FTT signal from the second terminal device in response to the error data and the TCF signal sent to the second terminal device.

15. The gateway device according to claim 11, wherein the control means controls a modem speed such that the modem speed does not decrease when the control means receives an FTT signal from the second terminal device in response to the error data and the TCF signal sent to the second terminal device.

16. The gateway device according to claim 12, wherein the control means controls a modem speed such that the modem speed does not decrease when the control means receives an FTT signal from the second terminal device in response to the error data and the TCF signal sent to the second terminal device.

17. The gateway device according to claim 13, wherein the control means controls a modem speed such that the modem speed does not decrease when the control means receives an FTT signal from the second terminal device in response to the error data and the TCF signal sent to the second terminal device.

18. The gateway device according to claim 10, wherein an amount of the error is at least four times as much as the TCF signal.

19. A method for transmitting facsimile image data comprising:
receiving a packet data from a second communication network;
inverting the packet data into the facsimile image data;
normally transmitting the facsimile image data to a second communication terminal device via a third communication network; and
appending an error data that is purposely preset to indicate that an error condition exists to a TCF signal and, in order to prevent a change in transmission speed, transmitting the error data together with the TCF signal, instead of a standard TCF signal in which error data is preset to indicate that an error condition does not exist, to the second communication terminal device via the third communication network if an amount of the facsimile image data stored in the storage unit is smaller than a prescribed amount.

20. The method according to claim 19 further comprising:
scanning document having plurality of pages at a first communication terminal device;
preparing the facsimile image data to be sent to a first communication network;
receiving again when the image data of all the plurality of pages are not received by the gateway device or not transmitted to the second communication terminal from the gateway device and the amount of the facsimile image data stored in the storage unit is smaller than the prescribed amount, the facsimile image data from the second communication network; and
storing the facsimile image data into the storage unit.

* * * * *